United States Patent Office 3,048,573
Patented Aug. 7, 1962

3,048,573
CRYSTALLINE POLY(CIS-PROPENYL ALKYL ETHERS)
Richard F. Heck, Wilmington, Del., assignor to Hercules Powder Company, Wilmington, Del., a corporation of Delaware
No Drawing. Filed Sept. 14, 1959, Ser. No. 839,971
4 Claims. (Cl. 260—91.1)

This invention relates to new polymers of propenyl alkyl ethers that are crystalline and of high molecular weight.

Propenyl alkyl ethers have been polymerized previously only to relatively low molecular weight, amorphous polymers having relatively low softening points and, hence, of limited utility.

Now in accordance with this invention, propenyl alkyl ethers have been polymerized to high molecular weight (having reduced specific viscosities of at least 0.5 as measured in chloroform at 25° C. or in toluene at 50° C.), crystalline polymers which are useful for the preparation of fibers, films and other plastic uses. Because of their low degree of solubility coupled with a high melting point, they are particularly useful in fiber and film applications.

Since these ethers are generally prepared by the condensation of an alcohol with propionaldehyde and dehydration of the intermediate addition product, they frequently are produced as mixtures of the cis- and trans-isomers, with the cis-isomer predominating. These mixtures may be polymerized as such or if desired, the monomeric mixture may be fractionated and the pure cis- or trans-isomer can be polymerized. Most surprisingly it has been found that when either the cis- or trans-isomer or a mixture of the two is polymerized in accordance with this invention, the polymer produced has the X-ray diffraction pattern of the polymer produced from the pure cis-isomer. Apparently the trans-isomer is isomerized and forms the cis-polymer, which could account for the fact that the cis-isomers polymerize considerably faster than the trans-isomers. In any event the trans-isomer yields a much lower molecular weight polymer than does either the cis-isomer or a mixture of the two wherein the cis-isomer predominates. Exemplary of the propenyl alkyl ethers that may be polymerized to crystalline products having RSV's of at least 0.5 as measured in toluene at 50° C. are propenyl methyl ether, propenyl ethyl ether, propenyl propyl ether, propenyl isopropyl ether, propenyl butyl ether, propenyl isobutyl ether, propenyl tert-butyl ether, propenyl 2-chloroethyl ether, propenyl 2-methoxyethyl ether, propenyl neopentyl ether, etc.

The preparation of these new crystalline propenyl alkyl ethers is readily carried out by polymerization of the propenyl alkyl ether wherein there is used as the catalyst, the reaction product of an aluminum trialkyl or an aluminum trialkoxide with sulfuric acid. Another catalyst that is effective for the production of these crystalline polymers is the reaction product produced when a metallic sulfate is reacted with a metal alkyl or alkoxide. Exemplary of these catalysts are the reaction products of triethylaluminum, triisobutylaluminum, trihexylaluminum, etc., with sulfuric acid, the reaction products of aluminum isopropoxide, aluminum isobutoxide, etc., with sulfuric acid and the reaction products of aluminum sulfate with aluminum isopropoxide, titanium isopropoxide, etc.

The polymerization reaction is generally, for convenience in handling, carried out in an inert, liquid, organic diluent. Suitable diluents that may be used are aliphatic, cycloaliphatic and aromatic hydrocarbons such as hexane, heptane, cyclohexane, benzene, toluene, xylene, etc., halogenated hydrocarbons such as methylene chloride, chloroform, carbon tetrachloride, chlorobenzene, etc., ethers such as diethyl ether, diisopropyl ether, etc., esters such as ethyl acetate, etc. In general, the reaction is carried out at −50° C. to 100° C. or higher and preferably within the range of from about −10° C. to about 50° C.

When the polymerization is carried out as described above, the polymer is readily isolated from the solution or slurry of polymer and diluent by simply removing the diluent by evaporation or other such means. Frequently it is desirable to add a stabilizer as the diluent is removed at an elevated temperature. The polymer may then be purified to remove the catalyst residues by washing with an alcoholic solution of acid or base or by dissolving the polymer in a suitable solvent such as hot benzene or toluene, filtering to remove the insoluble catalyst and then separating the polymer from the so-purified solution.

In some cases both an amorphous and a crystalline polymer are produced. In this case the crystalline polymer is readily separated by extracting the amorphous polymer, the latter being much more soluble in such solvents as hexane, acetone, methyl isobutyl ketone, etc.

The poly(cis-propenyl alkyl ethers) of this invention are high molecular weight, high melting, tough polymers which can be injection molded, extruded or compression molded. They may be used in the form of oriented film for protective wrappings, and as oriented fiber in tire cord, textile fibers, in resin reinforcement, in nonwoven fabrics, in rope, etc.

The following examples will illustrate the preparation of the new crystalline poly(propenyl alkyl ethers) of this invention. The molecular weight of the polymers produced in these examples is indicated by the reduced specific viscosity (RSV) given for each. By this term "reduced specific viscosity" is meant the $\eta sp/c$. determined on an 0.1% solution (0.1 g. of the polymer per 100 ml. of solution) of the polymer in chloroform at 25° C. or in toluene at 50° C. Where the melting point is given, it is the temperature at which birefringence due to crystallinity disappears. All parts and percentages are by weight unless otherwise indicated.

*Example 1*

The catalyst used in this and the following examples was prepared by mixing under nitrogen 12 cc. of an 0.85 M solution of aluminum isopropoxide in heptane with 0.12 cc. of 100% sulfuric acid and shaking the mixture with glass beads for 2 hours. The catalyst was then allowed to stand at room temperature for 18 hours after which it was stored at −5° C. until used.

A polymerization vessel was charged with 2.5 parts of propenyl methyl ether which contained about 70% of the cis-isomer and about 30% of the trans-isomer, 14 parts of methylene chloride and 0.20 part of aluminum isopropoxide added as an 0.85 M solution in heptane. The reaction mixture was cooled to 0° C. and with agitation an amount of the above catalyst mixture equivalent to 0.017 part of aluminum was added. The reaction mixture was agitated at 0° C. for 4 hours and then at room temperature for 18 hours after which the polymerization was stopped by adding 1.5 parts of a 1.0 M solution of ammonia in ethanol. The diluent was removed in vacuum, and the crude polymer so obtained was then extracted several times with acetone. The acetone-insoluble fraction was shown to be crystalline by X-ray and had a melting point of 287° C. and an RSV of 1.27 (chloroform at 25° C.).

*Example 2*

A polymerization vessel with a nitrogen atmosphere was charged with 4 parts of pure cis-propenyl ethyl ether and 0.054 part of triisobutyl aluminum, added as an 0.85 M solution of its tetrahydrofurane complex in heptane, no other diluent being added. The reaction mixture was agitated, cooled to 0° C. and an amount of the above-described catalyst mixture equivalent to 0.017 part based on aluminum was added. After agitating at 0° C. for 2 hours and then at room temperature for 18 hours, the polymer was isolated as described in Example 1. The acetone-insoluble polymer so obtained had a yield of 60%. It was further purified by dissolving it in hot benzene, filtering and then removing the benzene. The so-purified poly(cis-propenyl ethyl ether) so obtained had an RSV of 1.00 (chloroform at 25° C.) and had a crystalline melting point of 231° C.

*Example 3*

A polymerization vessel was charged with 2 parts of pure cis-propenyl ethyl ether, 9 parts of benzene and 0.054 part of triisobutylaluminum added as an 0.9 M solution of the 1:1 molar complex of triisobutylaluminum and tetrahydrofuran in heptane. The reaction mixture was cooled to 0° C. and an amount of the above-described catalyst mixture equivalent to 0.017 part based on aluminum was added. After agitating at 0° C. for 2 hours and then at room temperature for 18 hours, the polymerization was stopped by adding 1.5 parts of a 1.0 M solution of ammonia in ethanol. After removing the diluents under vacuum, the crude polymer which was obtained as a residue was extracted with boiling methyl isobutyl ketone. The hot methyl isobutyl ketone-insoluble product had a crystalline melting point of 220° C. and an RSV of 1.29 (chloroform at 25° C.). This poly(cis-propenyl ethyl ether) was insoluble in hexane as well as in methyl isobutyl ketone.

*Example 4*

To a nitrogen filled polymerization vessel was added 3.3 parts of chlorobenzene, 2.3 parts of cis-propenyl n-propyl ether and 0.034 part of aluminum isopropoxide, added as an 0.85 M solution in n-heptane. After cooling to 0° C., there was added, with agitation, 0.085 part based on aluminum of the catalyst mixture described above and after one hour a second and equal portion of catalyst was added. After three hours at 0° C. the reaction mixture was allowed to warm to room temperature and stirring was continued overnight. The polymer was isolated as described in Example 1. The acetone-insoluble polymer was further purified by dissolving it in hot toluene, filtering and then evaporating the solvent. The white solid so obtained had a crystalline melting point of 168° C., an RSV of 0.65 (chloroform at 25° C.) and was shown to be highly crystalline by X-ray.

*Example 5*

Example 4 was repeated except that toluene (2.6 parts) was used as the diluent instead of chlorobenzene. The purified crystalline polymer had a melting point of 158° C., an RSV of 0.50 (chloroform at 25° C.) and analysis showed it to contain 72.06% carbon (theory 71.92%) and 12.24% hydrogen (12.08% theory).

*Example 6*

A polymerization vessel with a nitrogen atmosphere was charged with 3.3 parts of chlorobenzene, 2.3 parts of cis-propenyl ethyl ether and 0.10 part of aluminum isopropoxide added as an 0.85 M solution in heptane. The reaction mixture was cooled to 0° C., agitated, and 0.017 part of the above-described catalyst was added. After stirring for 3 hours at 0° C. and overnight at 25° C., 1 part of a 1 M solution of ammonia in ethanol was added to inactivate the catalyst. One part of a 1% solution of 4,4'-thiobis(6-tert.-butyl-m-cresol) in ethanol was added as a stabilizer and the diluent was evaporated under vacuum. The residue was extracted with methylene chloride at 25° C. to remove amorphous and low crystallinity fractions. The highly crystalline polymer that remained had an RSV of 3.4 (toluene at 50° C.).

*Example 7*

A polymerization vessel with a nitrogen atmosphere was charged with 8.8 parts of benzene, 2.3 parts of propenyl isopropyl ether (a mixture of about 65% trans- and 35% cis-isomers) and 0.05 part of aluminum isopropoxide added as an 0.85 M solution in n-heptane. The mixture was cooled to 0° C. and stirred while 0.085 part of the above-described catalyst was added. After stirring at 0° C. for 2 hours and overnight at room temperature, 2 parts of a 1 M solution of ammonia in ethanol was added to deactivate the catalyst and one part of a 1% solution of 4,4'-thiobis(6-tert.-butyl-m-cresol) in ethanol was added as a stabilizer. The solution was then evaporated to dryness in vacuum and the amorphous polymer was extracted with methanol. The methanol-insoluble poly(propenyl isopropyl ether) which remained was shown to be crystalline by X-ray.

*Example 8*

The catalyst used in this example was prepared by shaking with glass beads under nitrogen a mixture of 14.7 parts of aluminum isopropoxide, added as an 0.72 M solution in heptane, and 1.46 parts of 100% sulfuric acid for 16 hours at room temperature. The catalyst slurry was then stored at −5° C. until used.

A polymerization vessel with a nitrogen atmosphere was charged with 1000 parts of anhydrous benzene, 10.6 parts of triisobutylaluminum, added as an 0.9 M solution of its tetrahydrofuran complex in n-heptane, and 490 parts of cis-propenyl ethyl ether (98–99% cis-isomer). Agitation was begun and after cooling to 2° C. an amount of the above catalyst slurry equivalent to 1.5 parts of aluminum was added. A second and equal portion of the catalyst was added after 6 hours, the reaction mixture was allowed to warm to room temperature (25–30° C.) and after 16 hours a third portion of the catalyst was added followed by a fourth portion in 4 hours and a fifth after another hour, after which agitation of the mixture was continued for another 16 hours. The viscous yellow solution was then treated with 50 parts of a 1 M solution of ethanolic ammonia and 50 parts of a 1% solution of 4,4'-thiobis(6-tert.-butyl-m-cresol) in ethanol. The diluents were removed under vacuum and the residue that remained was extracted three times in a blendor with methylene chloride. The highly crystalline polymer which remained had an RSV of 2.51 in toluene at 50° C. (it was insoluble in chloroform). This methylene chloride and chloroform insoluble polymer was further fractionated by extraction with boiling toluene. The toluene-soluble fraction had an RSV of 2.32 (toluene at 50° C.). The toluene-insoluble fraction was insoluble in hot dimethylformamide and cyclohexanone but was soluble in boiling tetrachloroethane. After solution in the latter solvent, it did dissolve in hot toluene and the RSV measured in toluene at 50° C. was 3.7.

The toluene-soluble poly(cis-propenyl ethyl ether) having an RSV of 2.32 (toluene at 50° C.) was compression molded into film. It formed clear, somewhat brittle, sheets which when heated to 85–90° and oriented by drawing 500% lost their brittleness. The oriented film had a tensile strength of 18,000 p.s.i., a maximum elongation of 20%, and a tensile modulus of 300,000 p.s.i. The RSV after molding was 1.4 (toluene at 50° C.). This toluene-soluble polymer was also extruded at 250° into strong monofilaments which could be oriented by drawing.

What I claim and desire to protect by Letters Patent is:

1. As a new composition of matter a crystalline poly (cis-propenyl alkyl ether) having an RSV of at least about 0.5, as determined in toluene at a temperature of 50° C., wherein the alkyl group contains from 1 to 5 carbon atoms, said polymer having been produced by polymerization of the monomer in contact at −50 to 100° C. with a catalyst obtained by reacting a substance of the group consisting of metal alkyl and metal alkoxide with a substance of the group consisting of sulfuric acid and aluminum sulfate, said metal being selected from the group consisting of aluminum and titanium.

2. The product of claim 1 wherein the poly(cis-propenyl alkyl ether) is poly(cis-propenyl methyl ether).

3. The product of claim 1 where the poly(cis-propenyl alkyl ether) is poly(cis-propenyl ethyl ether).

4. The product of claim 1 wherein the poly(cis-propenyl alkyl ether) is poly(cis-propenyl propyl ether).

References Cited in the file of this patent
UNITED STATES PATENTS

| | | |
|---|---|---|
| 2,104,000 | Reppe et al. | Dec. 28, 1937 |
| 2,457,661 | Grosser | Dec. 28, 1948 |